(12) United States Patent
Shim et al.

(10) Patent No.: US 8,712,487 B2
(45) Date of Patent: *Apr. 29, 2014

(54) SLIDING-TYPE PORTABLE COMMUNICATION DEVICE

(75) Inventors: Seon-Hee Shim, Suwon-si (KR);
Jae-Ohul Jin, Suwon-si (KR);
Young-Ki Kim, Seongnam-si (KR);
Ki-Taek Kim, Yongin-si (KR);
Hong-Moon Chun, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 735 days.

This patent is subject to a terminal disclaimer.

(21) Appl. No.: 12/483,648

(22) Filed: Jun. 12, 2009

(65) Prior Publication Data

US 2010/0016042 A1 Jan. 21, 2010

(30) Foreign Application Priority Data

Jul. 21, 2008 (KR) ........................ 10-2008-0070657

(51) Int. Cl.
*H04B 1/08* (2006.01)
*H04M 1/00* (2006.01)
*H04M 9/00* (2006.01)

(52) U.S. Cl.
USPC .................... 455/575.4; 455/575.1; 455/347; 379/440; 379/428.01

(58) Field of Classification Search
USPC ............... 455/575.1, 575.4, 347, 128, 575.8, 455/550.1; 379/440, 428.01
See application file for complete search history.

(56) References Cited

U.S. PATENT DOCUMENTS

| 8,200,299 B2 * | 6/2012 | Lim ........................... 455/575.4 |
| 2006/0154515 A1 * | 7/2006 | Seo ............................... 439/500 |
| 2007/0037618 A1 * | 2/2007 | Lee ........................... 455/575.4 |

FOREIGN PATENT DOCUMENTS

| KR | 1020040044213 A | 5/2004 |
| KR | 1020060112309 | 11/2006 |

* cited by examiner

*Primary Examiner* — Andrew Wendell
(74) *Attorney, Agent, or Firm* — The Farrell Law Firm, P.C.

(57) ABSTRACT

A sliding-type portable communication device is provided. The sliding-type portable communication device includes a first housing, a second housing slidably engaged with the first housing, face to face, and first and second sliding cover portions at both sides of the first housing, for sliding from both sides of the first housing, while sliding the second housing, thereby widening or narrowing the first housing.

10 Claims, 8 Drawing Sheets

SLIDING-TYPE PORTABLE COMMUNICATION DEVICE

PRIORITY

This application claims priority under 35 U.S.C. §119(a) to a Korean Patent Application filed in the Korean Intellectual Property Office on Jul. 21, 2008 and assigned Serial No. 10-2008-0070657, the entire disclosure of which is incorporated herein by reference.

BACKGROUND OF THE INVENTION

1. Field of the Invention

The present invention relates to a sliding-type portable communication device configured to slide cover portions at both sides of a housing, along with sliding another housing.

2. Description of the Related Art

A portable communication device is typically defined as an electronic device with which a user, while carrying it with him, can communicate wirelessly with another party. A variety of service contents including voice call service, short message transmission, mobile banking, TV broadcasting, on-line gaming, and Video On Demand (VOD) are provided to the user through the portable communication device.

Conventional portable communication devices are largely categorized into various types. For example, the portable communication devices are classified into a bar type, a flip or folder type, and a sliding type according to their outward looks. The bar-type portable communication device is characterized by a bar-shaped housing. A flip is rotatably engaged with a bar-type housing by a hinge device in the flip-type portable communication device. A folder is rotatably engaged with a single bar-type housing by a hinge device in the folder-type portable communication device.

In the sliding-type portable communication device, two housings slide lengthwise to an open or closed state. These various portable communication devices are known to those skilled in the art.

A detailed configuration of a sliding-type portable communication device is disclosed in Korea Patent Application No. 2002-71911, which is assigned to the assignee of the present application. In the sliding-type portable communication device described in this Korean application, a sliding module is provided for sliding a pair of housings and connected to the housings, for the sliding movement.

However, despite the trend toward mobile communication service diversity and multimedia functions of a product, the conventional portable communication devices still are constructed as the folder-type or the sliding-type. Moreover, the conventional portable communication devices have limitations in satisfying user tastes in shape even though the portable communication devices have been popular and the user tastes are varied.

Conventionally, the sliding-type portable communication device is configured so that one of two facing housings slides in one direction up to half of the length of the fixed housing. Therefore, only part of the space of the fixed housing is utilized and with a small number of keys in the limited space of the housing, text writing or gaming is inconvenient.

SUMMARY OF THE INVENTION

The present invention is designed to address at least the problems and/or disadvantages above and to provide at least the advantages described below.

Accordingly, an aspect of the present invention is to provide a sliding-type portable communication apparatus configured to slide sliding cover portions at both opposite sides of a housing along with sliding another housing, thereby contributing to miniaturization of a product by increasing the usable space of the product.

Another aspect of the present invention provides a sliding-type portable communication device for providing a space that is opened or closed by sliding movement of sliding cover portions at both opposite sides of a housing so that various devices including a plurality of keys, game-dedicated keys, a large display, a speaker, and a microphone can be positioned in the open space.

A further aspect of the present invention provides a sliding-type portable communication device for increasing a product utility by providing various devices including a plurality of keys, game-dedicated keys, a large display, a speaker, and a microphone in sliding cover portions at both opposite sides of a housing.

In accordance with an aspect of the present invention, a sliding-type portable communication device is provided. The sliding-type portable communication device includes a first housing, a second housing slidably engaged with the first housing, is face to face relation, and first and second sliding cover portions at both opposite sides of the first housing, for sliding from both opposite sides of the first housing, while sliding the second housing, thereby widening or narrowing the first housing.

In accordance with another aspect of the present invention, there is provided a sliding-type portable communication device including a first housing, a second housing slidably engaged with the first housing, in face to face relation, first and second sliding cover portions at both opposite sides of the first housing, for sliding from both opposite sides of the first housing, while sliding the second housing, thereby widening or narrowing the first housing, at least one sliding module between the first and second housings, for slidably engaging the second housing with the first housing, and at least one link portion between the first and second housings, for rotating at a predetermined angle, while sliding the second housing thereby sliding the first and second sliding cover portions in both perpendicular directions from the first housing.

BRIEF DESCRIPTION OF THE DRAWINGS

The above and other aspects, features, and advantages of certain embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EMBODIMENTS OF THE PRESENT INVENTION

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Referring to FIGS. 1 to 7, a sliding-type portable communication device 10 includes first and second housings 20 and 30, first and second sliding cover portions 40 and 50, one or more sliding modules 60, and one or more link portions 70. The first housing 20 faces the second housing 30 so that the second housing 30 can slide on a top surface of the first housing. The second housing 30 is slidably engaged with the first housing 20, facing the top surface of the first housing 20. The first and second sliding cover portions 40 and 50 are provided at both sides of the first housing 20, for sliding from both sides of the first housing 20, simultaneously with sliding of the second housing 30, thereby increasing or decreasing an exposed area of the first housing 20. The first housing 20 is provided with a microphone (not shown), a camera module (not shown), and a keypad 21. The second housing 30 has a large display 31 and a speaker (not shown).

The keypad 21 preferably has a 3×4 keypad or QWERTY key layout.

Figure 8:
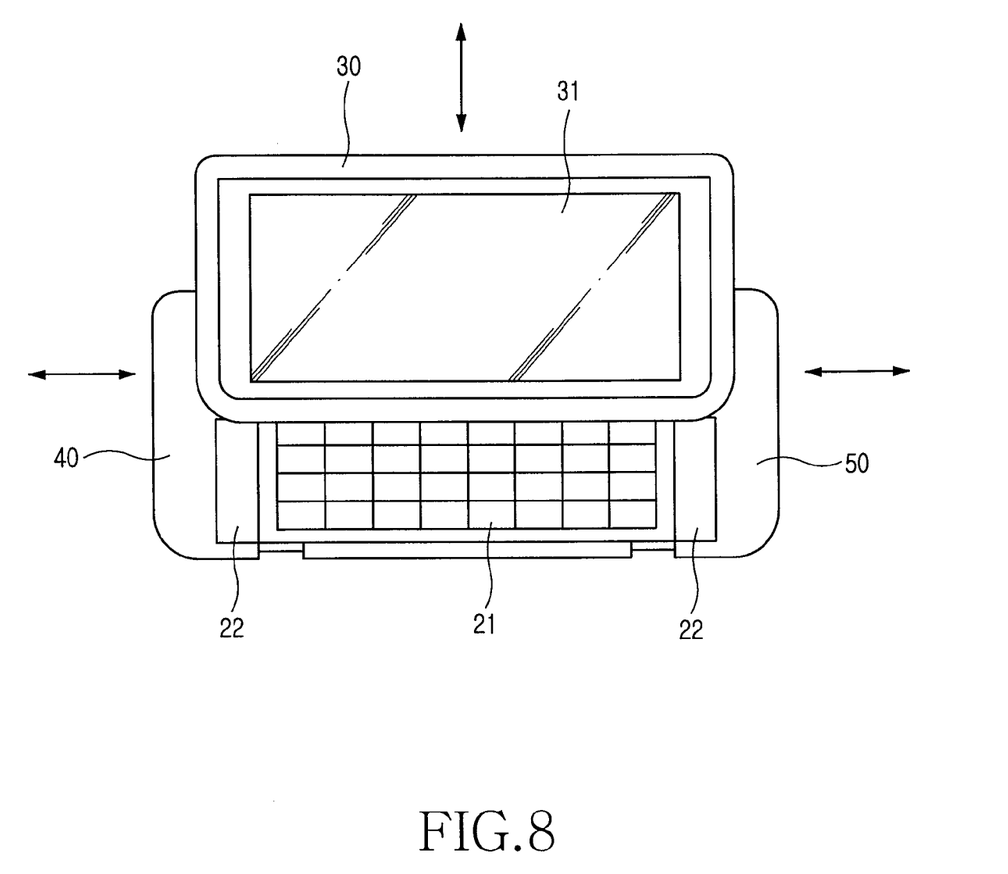
FIG. 8 is a plan view of the sliding-type portable communication device according to an embodiment of the present invention, in the opened state.

Referring to FIG. 8, first and second open spaces 22 are defined in the first housing 20 in order to open the space of the first housing 20 along with sliding of the first and second sliding cover portions 40 and 50. A variety of devices (not shown) for the portable communication device 10, such as a large display, a speaker, a microphone, four-directional keys, a navigation key, game-dedicated keys, and a keypad with an array of one or more keys, may reside in the first and second open spaces 22. A variety of devices (not shown) for the portable communication device 10, such as a large display, a speaker, a microphone, four-directional keys, a navigation key, game-dedicated keys, and a keypad, reside in the first and second sliding cover portions 40 and 50.

The large display, the speaker, the microphone, the four-directional keys, the navigation key, the game-dedicated keys, and the keypad provided in the first and second open spaces 22 and the first and second sliding cover portions 40 and 50 are not shown in FIGS. 1 to 8.

The first and second sliding cover portions 40 and 50 have sliding spaces 41 and 51 (FIG. 1) that allow the first and second sliding cover portions 40 and 50 to slide from both sides of the first housing 20.

Openings 42 and 52 (FIG. 1) are formed in the first and second sliding cover portions 40 and 50, to be engaged with or detached from both ends of the keypad 21.

As illustrated in FIGS. 1 to 7, the sliding modules 60 are interposed between the first and second housings 20 and 30 to engage the second housing 30 slidably with the first housing 20. The link portions 70 are interposed between the first and second housings 20 and 30, for rotating at a predetermined angle, while sliding the second housing 30, and thus sliding the first and second sliding cover portions 40 and 50 in both perpendicular directions of the first housing 20.

As illustrated in FIGS. 3 to 7, each of the sliding modules 60 includes base members 61 and a sliding member 62. The base members 61 are engaged with the first housing 20 so that the sliding member 62 can slide. The sliding member 62 is engaged with the second housing 30 at a position where it is mounted on base members 61, in order to slide the second housing 30 from the first housing 20.

Figure 1:
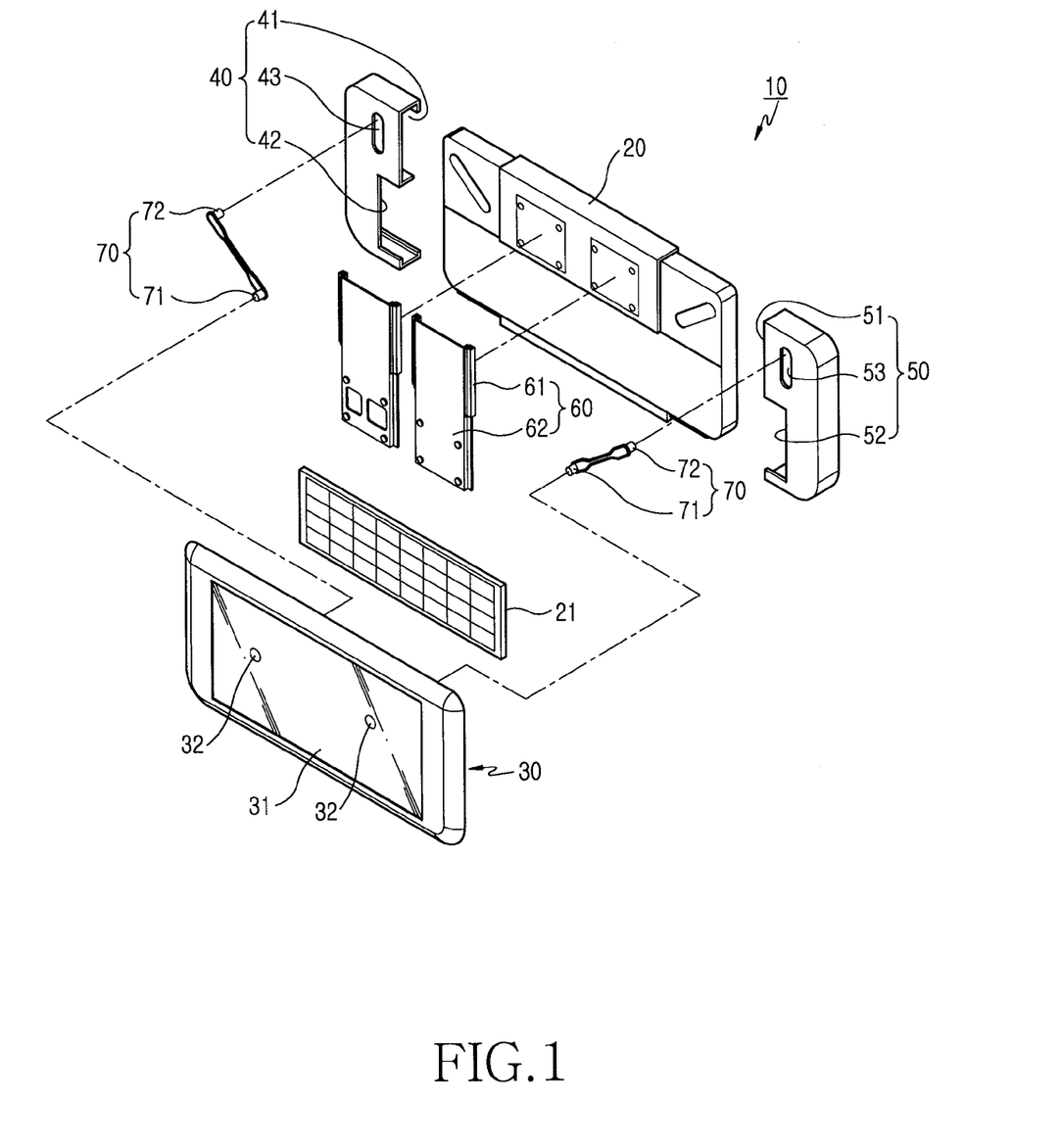
FIG. 1 is an exploded perspective view of a sliding-type portable communication device according to an embodiment of the present invention.

As illustrated in FIG. 1, each of the link portions 70 has one end engaged with a rotation engagement portion 32 of the second housing 30, for rotating the link portion 70 when the second housing 30 slides, and the other end engaged with a rotation sliding hole 43 formed in the first sliding cover portion 40 or a rotation sliding hole 53 formed in the second sliding cover portion 50, for rotating and sliding in the rotation sliding hole 43 or 53 during sliding of the second housing 30.

Figure 6:
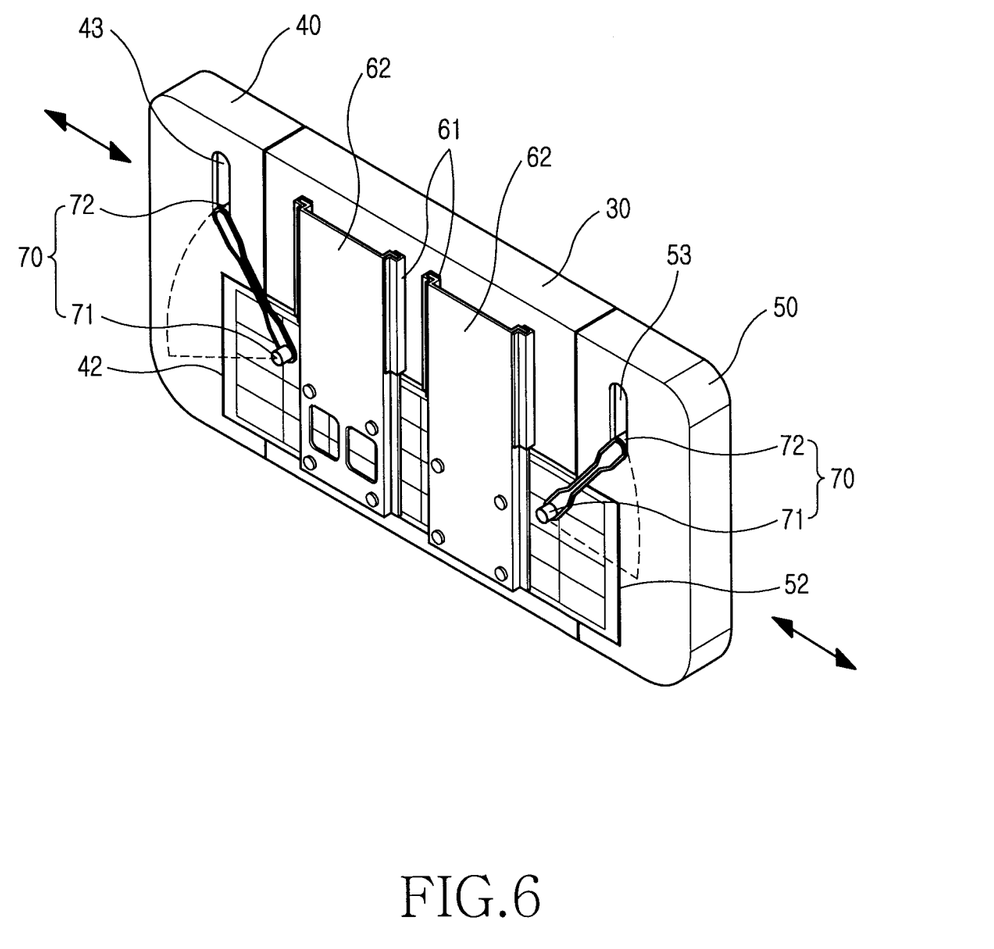
FIG. 6 is a perspective view of components of the sliding-type portable communication device according to an embodiment of the present invention, in the closed state.
Figure 7:
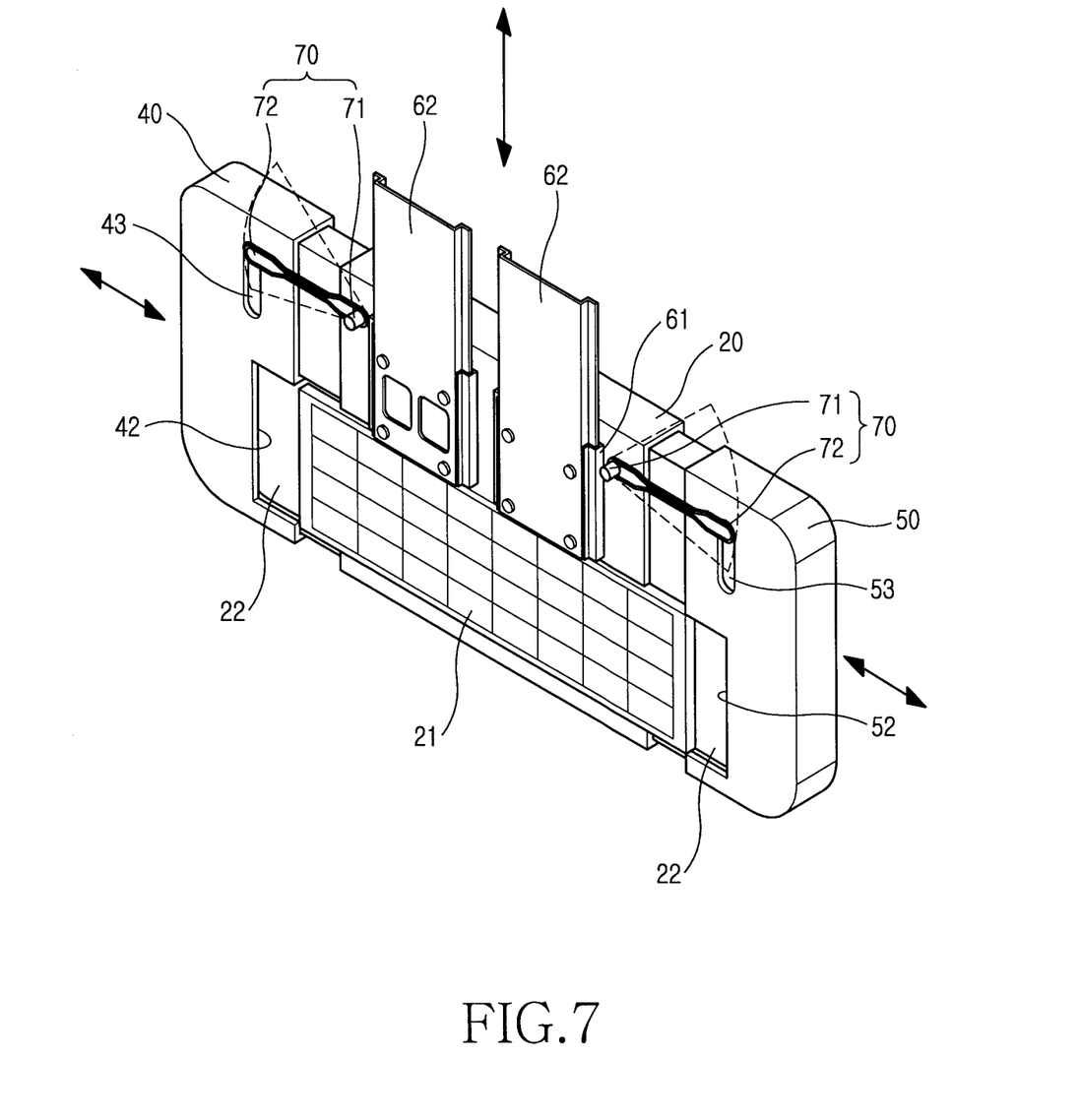
FIG. 7 is a perspective view of components of the sliding-type portable communication device according to an embodiment of the present invention, in the opened state.

As illustrated in FIGS. 6 and 7, the rotation engagement portions 32 are formed on the second housing 30 to be rotatably engaged with the one end of the link portions 70. The first and second sliding cover portions 40 and 50 have the rotation sliding holes 43 and 53 formed thereon, for allowing the other ends of the link portions 70 to rotate and slide.

The operation of the sliding-type portable communication device having the above-described configuration will be described in more detail with reference to FIGS. 1 to 8.

Referring to FIGS. 1 to 8, the sliding-type portable communication device 10 includes the first and second housings 20 and 30, the first and second sliding cover portions 40 and 50, the one or more sliding modules 60, and the one or more link portions 70.

The base members 61 of the sliding modules 60 are engaged with the first housing 20, and the sliding members 62 of the sliding modules 60 are engaged with the second housing 30.

In this state, the first housing 20 is engaged with the second housing 30, face-to-face so that the sliding members 62 can slide over the base members 61.

The first and second sliding cover portions 40 and 50 are slidably engaged at both opposite sides of the first housing 20.

The one ends 71 of the link portions 70 are rotatably engaged with the rotation engagement portions 32 of the second housing 30, and the other ends 72 thereof are rotatably and slidably engaged in the rotation sliding holes 43 and 53 of the first and second sliding cover portions 40 and 50.

The first housing 20 is provided with the microphone (not shown), the camera module (not shown), and the keypad 21. The second housing 30 is provided with the large display 31 and the speaker (not shown).

The keypad 21 preferably has a QWERTY layout.

Figure 4:
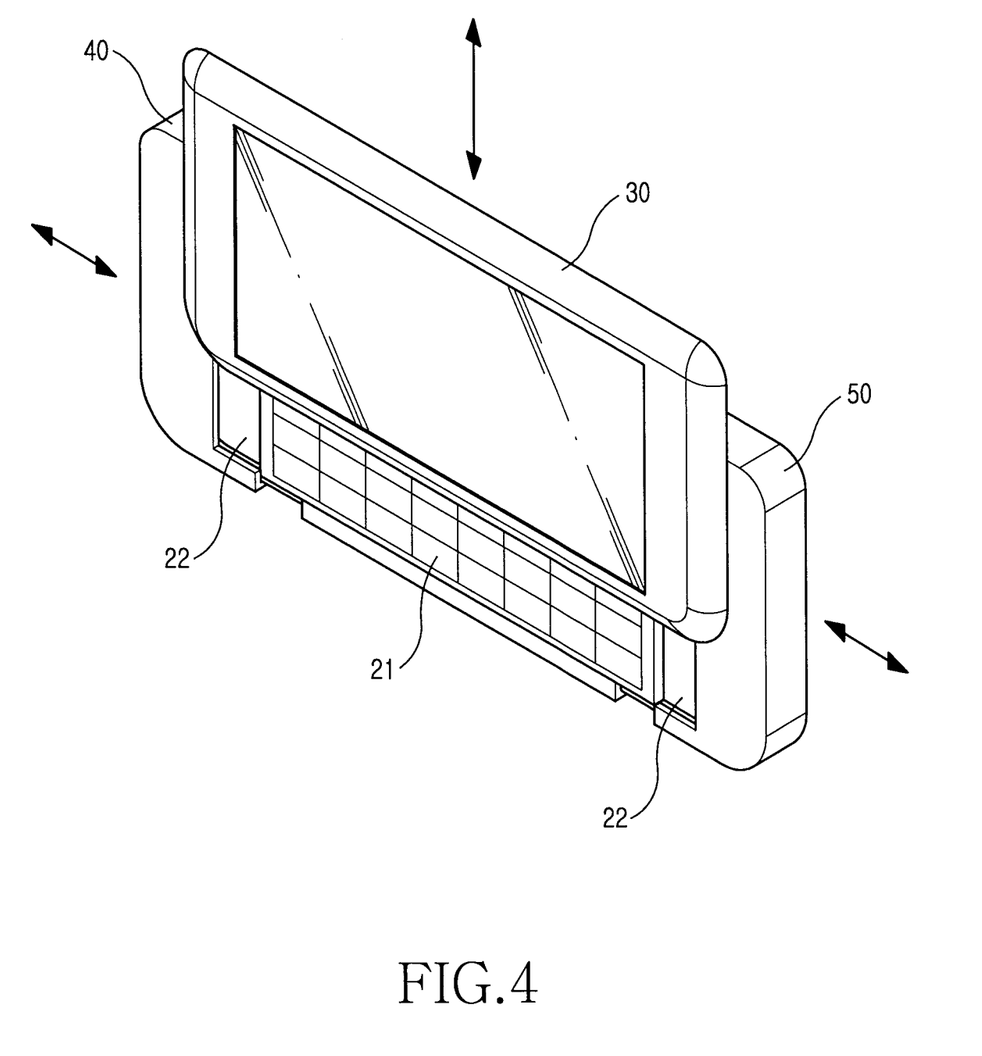
FIG. 4 is a perspective view of the sliding-type portable communication device according to the embodiment of the present invention, in an opened state.
Figure 5:
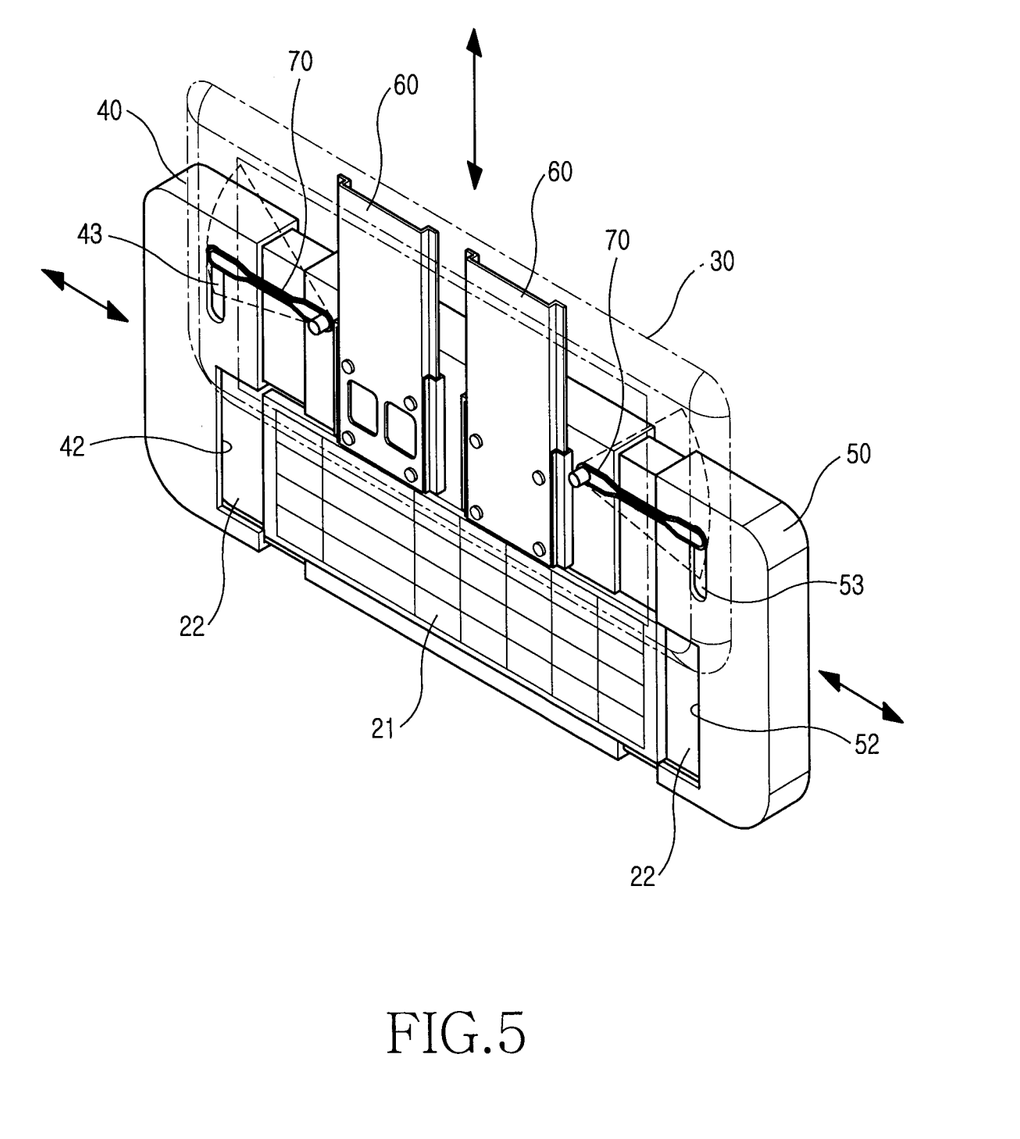
FIG. 5 is an interior perspective view of the sliding-type portable communication device according to an embodiment of the present invention, in the opened state.

Referring to FIGS. 4, 5 and 7, when a user slides the second housing 30 from the first housing 20 from a closed state, the keypad 21 of the first housing 20 is exposed and the link portions 70 rotate, thus sliding the first and second sliding cover portions 40 and 50 away from each other from both opposite sides of the first housing 20.

Along with the rotation of the one ends 71 of the link portions 70 in the rotation engagement portions 32 of the second housing 30, the other ends 72 of the link portions 70 rotate in the rotation sliding holes 43 and 53 of the first and second sliding cover portions 40 and 50.

Simultaneously with the rotation, the other ends 72 of the link portions 70 slides in the rotation sliding holes 43 and 53.

The first and second sliding cover portions 40 and 50 slide away from the first housing 20 by the link portions 70, thus expose the first and second open spaces 22 of the first housing 20.

The openings 42 and 52 formed in the first and second sliding cover portions 40 and 50 are detached from both ends of the QWERTY keypad 21.

Since various devices (not shown) of the portable communication device 10, such as the large display 31, the speaker, the microphone, the four-directional navigation keys, the game-dedicated keys, and the keypad 21, are provided in the first and second open spaces 22, the various devices are exposed along with the exposure of the first and second open spaces 22.

The first and second sliding cover portions 40 and 50 expose the top surface of the first housing 20. Since various devices (not shown) of the portable communication device 10, such as the large display 31, the speaker, the microphone, the four-directional navigation keys, the game-dedicated keys, and the keypad 21, are provided in the first and second sliding cover portions 40 and 50, they can be used along with the various devices of the first and second open spaces 22.

In this state, the user can enjoy gaming and other various functions through the portable communication device 10.

Figure 2:
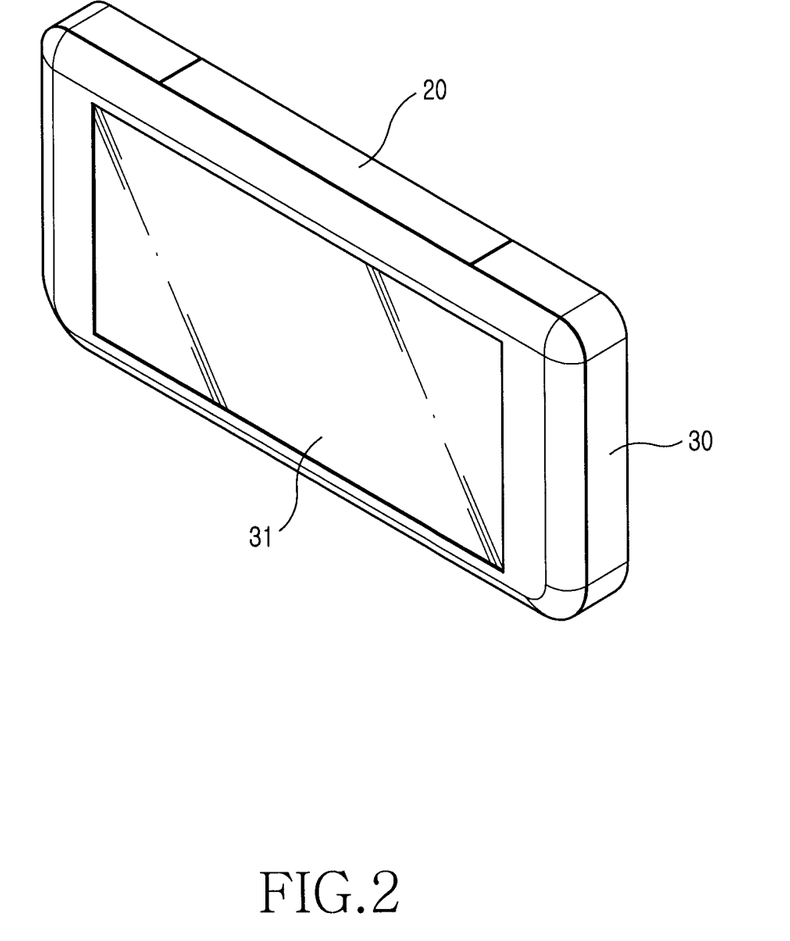
FIG. 2 is a perspective view of the sliding-type portable communication device according to the embodiment of the present invention in a closed state.
Figure 3:
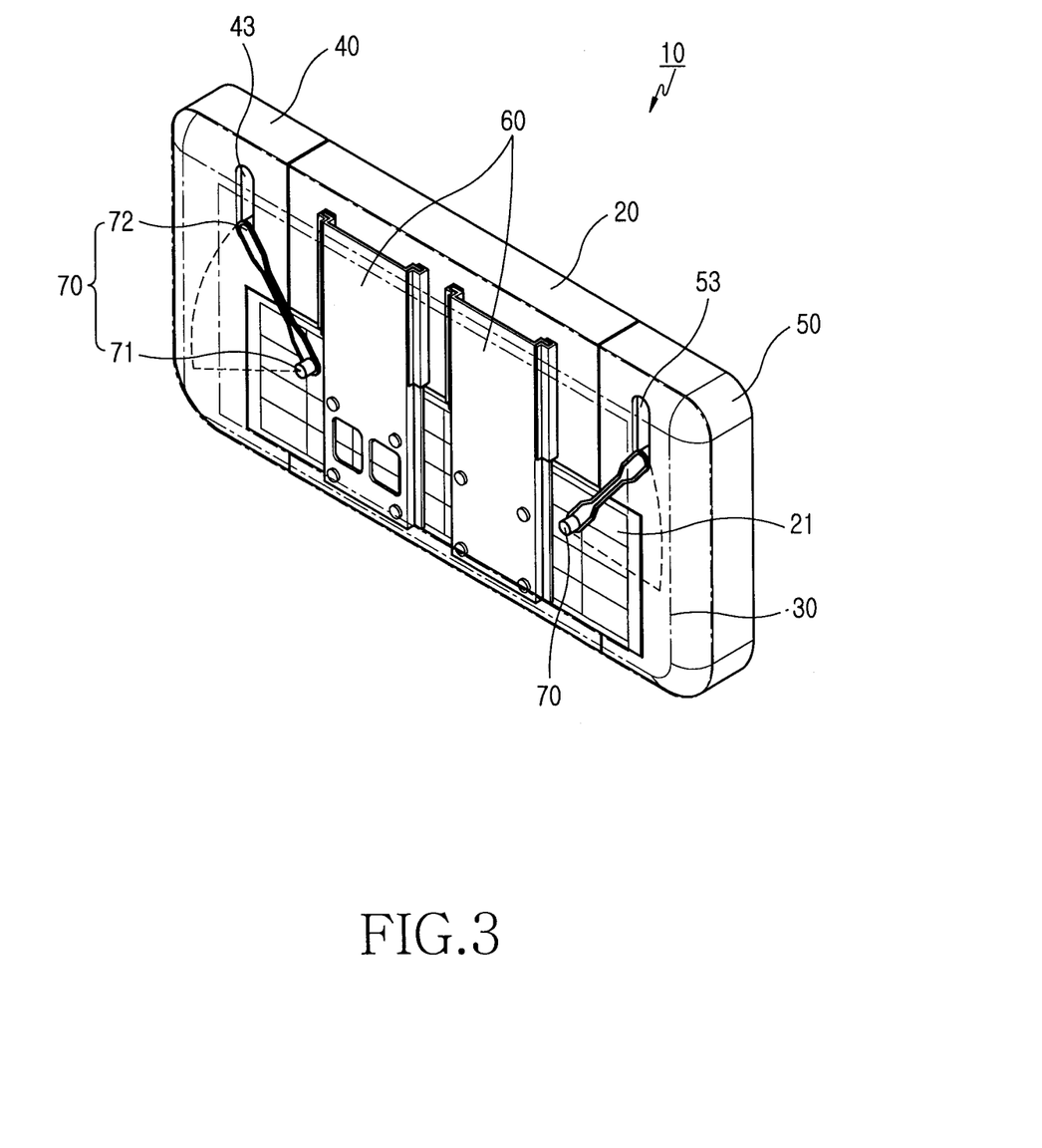
FIG. 3 is an interior perspective view of the sliding-type portable communication device according to the embodiment of the present invention, in the closed state.

Referring to FIGS. 2, 3 and 6, when the second housing 30 slides from an opened state back to its original position, i.e. the closed state, the end 71 of the link portions 70 rotate and the other ends 72 of the link portions 70 rotate and slide in the rotation sliding holes 43 and 53, thus sliding the first and second sliding cover portions 40 and 50 and closing the first and second open spaces 22.

As the first and second sliding cover portions 40 and 50 slide back to their original positions by the link portions 70, the top surface of the first housing 20 is covered.

The openings 42 and 52 of the first and second sliding cover portions 40 and 50 are brought again into engagement with both ends of the QWERTY keypad 21.

Since the available space of a product is increased or decreased by sliding the second housing and the sliding cover portions provided at both sides of the first housing, the present invention can miniaturize the product. Various devices for a communication device, such as a plurality of keys, game-dedicated keys, a large display, a speaker, and a microphone, can be provided in the open spaces opened or closed along with the sliding of the sliding cover portions and various devices can also be provided in the sliding cover portions.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A sliding-type portable communication device comprising:
    a first housing having a top surface;
    a second housing slidably engaged with the first housing, the second housing sliding on the top surface along a first direction from a closed state to an opened state;
    first and second sliding cover portions slidably coupled at both opposite sides of the first housing, the first and second sliding cover portions sliding away from each other along a second direction perpendicular to the first direction from the closed state to the opened state concurrently with the sliding of the second housing; and
    at least one link portion coupling a rotation engagement portion of the second housing to a rotation sliding hole of the first and second sliding cover portions, for rotating the at least one link portion at a predetermined angle, while sliding the second housing from the closed state to the opened state thereby concurrently sliding the first and second sliding cover portions away from the first housing.

2. The sliding-type portable communication device of claim 1, wherein the first housing includes a microphone, a camera module, and a keypad, and the second housing includes a large display and a speaker.

3. The sliding-type portable communication device of claim 2, wherein the keypad has one of a 3×4 keypad array and a QWERTY key array.

4. The sliding-type portable communication device of claim 1, wherein the first housing includes first and second open spaces for being opened along with sliding of the first and second sliding cover portions, and the first and second open spaces include a large display, a speaker, a microphone, a four-directional key, a navigation key, a game-dedicated key, and a keypad having an array of at least one key.

5. The sliding-type portable communication device of claim 1, wherein the first and sliding cover portions include a large display, a speaker, a microphone, a 4-directional key, a navigation key, a game-dedicated key, and a keypad.

6. The sliding-type portable communication device of claim 3, wherein the first and second sliding cover portions include sliding spaces for allowing the first and second sliding cover portions to slide away from the first housing, and openings for engaging with and receding from both ends of the keypad.

7. A sliding-type portable communication device comprising:
    a first housing having a top surface;
    a second housing slidably engaged with the first housing, the second housing sliding on the top surface along a first direction from a closed state to an opened state;
    first and second sliding cover portions slidably coupled at both opposite sides of the first housing, the first and second sliding cover portions sliding away from each other along a second direction perpendicular to the first direction from the closed state to the opened state concurrently with the sliding of the second housing;
    at least one sliding module between the first and second housings, for slidably engaging the second housing with the first housing; and
    at least one link portion coupling a rotation engagement portion of the second housing to a rotation sliding hole of the first and second sliding cover portions, for rotating the at least one link portion at a predetermined angle, while sliding the second housing from the closed state to the opened state thereby concurrently sliding the first and second sliding cover portions away from the first housing.

8. The sliding-type portable communication device of claim 7, wherein the at least one sliding module comprises:
    a base member engaged with the first housing; and
    a sliding member stacked on the base member, for sliding the second housing from the first housing.

9. The sliding-type portable communication device of claim 7, wherein the at least one link portion has one end engaged with the rotation engagement portion of the second housing and an other end engaged rotatably and slidably in the rotation sliding hole formed on at least one of the first and second sliding cover portions.

10. The sliding-type portable communication device of claim 7, wherein the second housing slides along a lateral direction of the first housing, and the first and second sliding cover portions slide oppositely along a longitudinal direction of the first housing.

\* \* \* \* \*